United States Patent [19]

Norberg et al.

[11] 4,055,299

[45] Oct. 25, 1977

[54] ENERGY SOURCE FOR LARGE HEATING SYSTEMS

[75] Inventors: Lars Norberg; Erik Olsson, both of Finspong, Sweden

[73] Assignee: Stal-Laval Turbin AB, Finspong, Sweden

[21] Appl. No.: 711,676

[22] Filed: Aug. 4, 1976

[30] Foreign Application Priority Data

Aug. 5, 1975 Sweden ................................ 7508803

[51] Int. Cl.² ........................................... G05D 23/00
[52] U.S. Cl. ...................................... 237/2 B; 62/238
[58] Field of Search ................. 237/2 B, 12.1; 62/324, 62/238, 323

[56] References Cited

U.S. PATENT DOCUMENTS

| 2,266,238 | 12/1941 | Newton | 237/2 |
| 3,392,541 | 7/1968 | Nussbaum | 62/324 |
| 3,777,508 | 12/1973 | Imabayashi et al. | 62/160 |
| 3,902,546 | 9/1975 | Linhardt et al. | 62/324 |
| 3,918,268 | 11/1975 | Nussbaum | 62/324 |

Primary Examiner—William E. Wayner
Assistant Examiner—Robert Charvay
Attorney, Agent, or Firm—Pollock, Vande Sande & Priddy

[57] ABSTRACT

An energy source for large heating systems, such as municipal systems, is disclosed which includes a heat pump driven directly by an internal combustion engine. The exhaust gases from the engine are passed through a heat exchanger to provide additional heat input to hot water leaving the condenser of the heat pump. In one embodiment, the exhaust gases also provide heat input to the evaporator of a second heat pump unit also driven directly by the internal combustion engine.

2 Claims, 2 Drawing Figures

ENERGY SOURCE FOR LARGE HEATING SYSTEMS

BACKGROUND AND OBJECTS OF THE INVENTION

It is known to feed a heating system from a heat pump, whereby the heat pump takes up heat from the surroundings. In small capacity plants it is common to drive the heat pump with an electric motor; but if the available quantity of heat from the surroundings is so great that it is sufficient at least partly to feed a municipal heating network, economical operation can be achieved according to the invention by driving the heat pump with its own combustion engine. This results in a favorable heat economy for the assembled unit, the capacity of which is determined by the amount of heat available in the surrounding.

An object of the invention is to provide a high capacity heat pump unit suitable for use in heating large buildings or municipalities.

Another object of the invention is to provide such a unit which is driven by a combustion engine and includes provision for scavenging heat from the engine exhaust.

BRIEF DESCRIPTION OF THE DRAWING

The invention will be described in greater detail with reference to the accompanying drawing, in which FIG. 1 shows a first embodiment of the invention including a single heat pump; whereas.

DETAILED DESCRIPTION OF THE PREFERRED EMBODIMENTS

Figure 1:
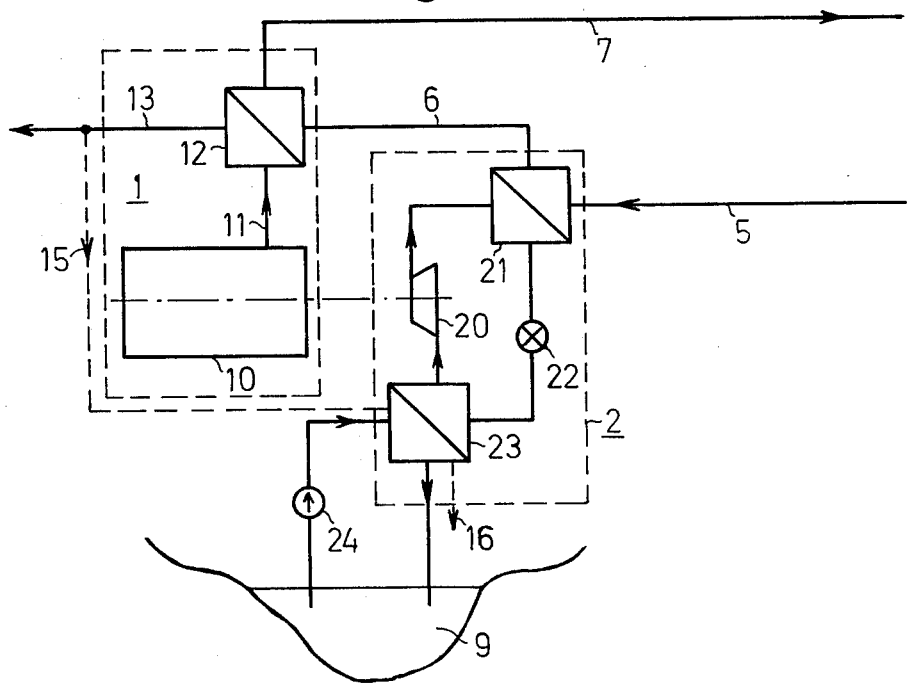

There follows a detailed description of the preferred embodiment, reference being had to the drawing in which like reference numerals identify like elements of structure in each of the several figures.

FIG. 1 shows a unit according to the invention comprising a power machine 1 and a heat pump 2. A combustion engine 10 has an outlet opening connected to an exhaust pipe 11 leading to an exhaust heat-exchanger 12 from which the exhaust gases pass out through a tube 13.

Heat pump 2 comprises a compressor 20 which is driven by combustion engine 10. The compressed heat exchange medium from compressor 20 is passed to a condenser 21 and from there through an expansion valve 22 to an evaporator 23.

Figure 2:
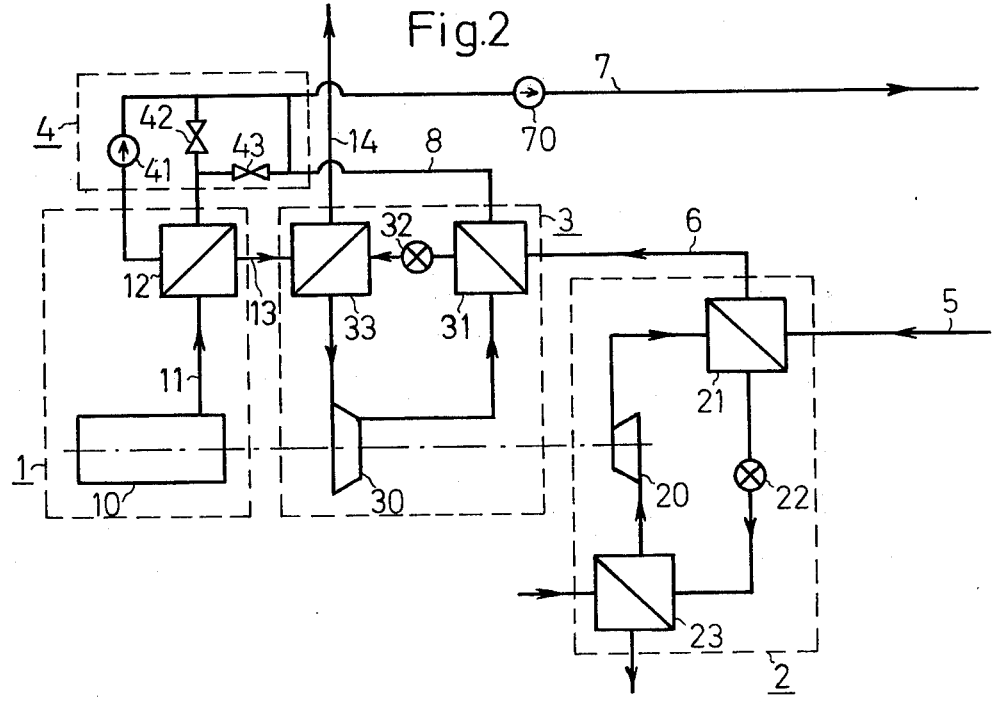
FIG. 2 shows a second embodiment including a parallel, commonly driven heat pump unit.

The water from the municipal heating networks comes in through a conduit 5 and receives a first heating in condenser 21 of heat pump 2, from where the water passes through a tube 6 to a final heating in exhaust heat-exchanger 12 and thereafter out into the network through a conduit 7 with a circulating pump 70 (see FIG. 2).

The heating of evaporator 23 can take place, for example, by withdrawing heat from a lake or a stream 9, using a pump 24 which circulates water through evaporator 23. Possibly the heat can be taken from the surrounding air. A third possibility is to absorb the after- heat from the exhaust gases, as indicated by dashed lines 15, 16.

FIG. 2 shows a further development of the invention showing power machine 1, heat pump 2 and municipal heating conduits 5, 6, 7. Evaporator 23 is heated from the surroundings in a manner not shown. In addition to this the plant has been supplemented with an additional heat pump 3, the compressor 30 of which is also driven by combustion engine 10. The working medium is led through the condenser 31 for feeding the municipal heating networks and from there through the expansion valve 32 and the evaporator 33 which is connected to the exhaust gas conduit 13 from the outlet of the heat-exchanger 12. In this way it is possible to obtain the residual heat from the exhaust gases which are carried away through the conduit 14.

In the embodiment of FIG. 2 the water in the municipal heating networks is passed through the condenser 21 and the conduit 6 to the condenser 31. From there the water passes through the conduit 8 and a shunt control system 4 to the heat-exchanger 12 before being passed out into the network through the conduit 7. With the help of the shunt control system 4 comprising the circulating pump 41 and regulating valves 42, 43, the temperature in heat-exchanger 12 can be maintained at such a high level that condensation and thus corrosion are avoided in this heat-exchanger. On the other hand, it may be difficult to avoid condensation in the evaporator 33 which must therefore be protected against corrosion by conventional means familiar to those in the art. Those skilled in the art will recognize that the illustrated one-stage heat pumps 2 and 3 can possibly be designed in several stages if desired, without departing from the spirit of the invention.

Having described our invention in sufficient detail to enable those skilled in the art to make and use it, we claim:

1. An energy source for a heating system of the type having a flowing medium to be heated, comprising:
   a first heat pump having a first evaporator for withdrawing heat from the surrounding environment, a a first compressor, and a first condenser for rejecting heat to said medium to be heated;
   a second heat pump having a second evaporator, a second compressor and a second condenser for rejecting heat to said medium to be heated;
   a combustion engine drivingly connected to said first and second compressors, said engine having a first exhaust gas outlet;
   a heat exchanger connected to receive exhaust gases from said first outlet and to reject heat from said gases to said medium to be heated, said heat exchanger having a second exhaust gas outlet for said gases, said second outlet being connected to direct said gases from said first heat exchanger to said second evaporator whereby fluid flowing in said second evaporator is heated as heat is withdrawn from said exhaust gases.

2. An energy source according to claim 1, further comprising shunt means for selectively directing said medium to flow through said second condenser or through said second condenser and said heat exchanger, in order to regulate the exhaust gas tempertures in said heat exchanger and said second evaporator.